(12) United States Patent
Markle et al.

(10) Patent No.: US 7,289,867 B1
(45) Date of Patent: Oct. 30, 2007

(54) AUTOMATED INTEGRATED CIRCUIT DEVICE MANUFACTURING FACILITY USING DISTRIBUTED CONTROL

(75) Inventors: Richard J. Markle, Austin, TX (US); Chandrashekar Krishnaswamy, Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 237 days.

(21) Appl. No.: 11/148,092

(22) Filed: Jun. 8, 2005

(51) Int. Cl.
*G06F 19/00* (2006.01)

(52) U.S. Cl. .................................................. 700/121

(58) Field of Classification Search ................ 700/19, 700/20, 28, 95, 96, 108–110, 117, 121
See application file for complete search history.

(56) References Cited

U.S. PATENT DOCUMENTS

| | | | |
|---|---|---|---|
| 5,344,365 A | 9/1994 | Scott et al. | 454/187 |
| 6,243,612 B1 | 6/2001 | Rippenhagen et al. | 700/100 |
| 6,314,379 B1* | 11/2001 | Hu et al. | 702/81 |
| 6,708,074 B1* | 3/2004 | Chi et al. | 700/121 |
| 6,813,523 B2* | 11/2004 | Mauro | 700/9 |
| 6,853,876 B2* | 2/2005 | Wehrung et al. | 700/230 |
| 7,110,835 B2* | 9/2006 | Blevins et al. | 700/83 |
| 7,130,762 B2* | 10/2006 | Hellig et al. | 702/182 |
| 7,146,231 B2* | 12/2006 | Schleiss et al. | 700/83 |
| 2003/0220708 A1* | 11/2003 | Sahin et al. | 700/121 |
| 2005/0096872 A1* | 5/2005 | Blevins et al. | 702/183 |
| 2005/0267607 A1* | 12/2005 | Paik | 700/31 |
| 2006/0042543 A1* | 3/2006 | Funk et al. | 118/712 |
| 2006/0047356 A1* | 3/2006 | Funk et al. | 700/121 |
| 2006/0184264 A1* | 8/2006 | Willis et al. | 700/108 |

\* cited by examiner

*Primary Examiner*—M. N. Von Buhr
(74) *Attorney, Agent, or Firm*—Williams, Morgan & Amerson

(57) ABSTRACT

The system includes a plurality of process modules and an independent module controller for each of the plurality of process modules that is adapted to control the process tools within each of the process modules. Each of the independent module controllers performs at least run-to-run control of the processing tools, yield management analysis, scheduling of materials provided to and sent from the process module, and movement of wafers within the process module. One method of the present invention involves providing a plurality of process modules, each of which has an independent module controller that is adapted to perform at least run-to-run control of the processing tools within the process module, yield management analysis, scheduling of materials, and movement of wafers within the process module. The independent module controller for each of the process modules controls the process tools within its respective process module that are employed in forming a portion of the integrated circuit device.

41 Claims, 5 Drawing Sheets

AUTOMATED INTEGRATED CIRCUIT DEVICE MANUFACTURING FACILITY USING DISTRIBUTED CONTROL

BACKGROUND OF THE INVENTION

1. Field of the Invention

This invention relates generally to manufacturing, integrated circuit devices, and, more particularly, to an automated integrated circuit device manufacturing facility employing a distributed control system.

2. Description of the Related Art

There is a constant drive within the semiconductor industry to increase the quality, reliability and throughput of integrated circuit devices, e.g., microprocessors, memory devices, and the like. This drive is fueled by consumer demands for higher quality computers and electronic devices that operate more reliably. These demands have resulted in a continual improvement in the manufacture of semiconductor devices, e.g., transistors, as well as in the manufacture of integrated circuit devices incorporating such transistors. Additionally, reducing the defects in the manufacture of the components of a typical transistor also lowers the overall cost per transistor as well as the cost of integrated circuit devices incorporating such transistors.

Generally, a set of processing steps is performed on a group (lot) of wafers using a variety of process tools, including photolithography steppers, etch tools, deposition tools, polishing tools, thermal anneal process tools, implantation tools, etc. The technologies underlying semiconductor process tools have attracted increased attention over the last several years, resulting in substantial refinements. However, despite the advances made in this area, many of the process tools that are currently commercially available suffer certain deficiencies. In particular, some of such tools often lack advanced process data monitoring capabilities, such as the ability to provide historical parametric data in a user-friendly format, as well as event logging, real-time graphical display of both current processing parameters and the processing parameters of the entire run, and remote, i.e., local site and worldwide, monitoring. These deficiencies can engender non-optimal control of critical processing parameters, such as throughput, accuracy, stability and repeatability, processing temperatures, mechanical tool parameters, and the like. This variability manifests itself as within-run disparities, run-to-run disparities and tool-to-tool disparities that can propagate into deviations in product quality and performance, whereas an ideal monitoring and diagnostics system for such tools would provide a means of monitoring this variability, as well as providing means for optimizing control of critical parameters.

One technique for improving the operation of a semiconductor processing line includes using a centralized factory-wide control system to automatically control the operation of the various process tools and related support system. The manufacturing tools communicate with a manufacturing framework or a network of processing modules. Each manufacturing tool is generally connected to an equipment interface. The equipment interface is connected to a machine interface that facilitates communications between the manufacturing tool and the manufacturing framework. The machine interface can generally be part of an advanced process control (APC) system. The APC system initiates a control script based upon a manufacturing model, which can be a software program that automatically retrieves the data needed to execute a manufacturing process. Often, semiconductor devices are staged through multiple manufacturing tools for multiple processes, generating data relating to the quality of the processed semiconductor devices.

During the fabrication process various events may take place that affect the performance of the devices being fabricated. That is, variations in the fabrication process steps result in device performance variations. Factors, such as feature critical dimensions, doping levels, contact resistance, particle contamination, etc., all may potentially affect the end performance of the device. Various tools in the processing line are controlled in accordance with performance models to reduce processing variation. Commonly controlled tools include photolithography steppers, polishing tools, etching tools, and deposition tools. Pre-processing and/or post-processing metrology data is supplied to process controllers for the tools. Operating recipe parameters, such as processing time, are calculated by the process controllers based on the performance model and the metrology information to attempt to achieve post-processing results as close to a target value as possible. Reducing variation in this manner leads to increased throughput, reduced cost, higher device performance, etc., all of which equate to increased profitability.

Target values for the various processes performed are generally based on design values for the devices being fabricated. For example, a particular process layer may have a target thickness. Operating recipes for deposition tools and/or polishing tools may be automatically controlled to reduce variation about the target thickness. In another example, the critical dimensions of a transistor gate electrode may have an associated target value. The operating recipes of photolithography tools and/or etch tools may be automatically controlled to achieve the target critical dimensions.

Typically, a control model is used to generate control actions for changing the operating recipe settings for a tool being controlled based on feedback or feedforward metrology data collected related to the processing by the tool. To function effectively, a control model must be provided with metrology data in a timely manner and at a quantity sufficient to maintain its ability to predict the future operation of the tool it controls.

Referring to FIG. 1, a simplified block diagram of an illustrative prior art manufacturing system 10 is provided. The illustrative manufacturing system 10 is adapted to fabricate integrated circuit devices including, but not limited to, microprocessors, memory devices, digital signal processors, application specific integrated circuits (ASICs), or other integrated circuit devices. Additionally, the centralized controller 90 may be employed to perform a variety of functions, such as, for example, scheduling of work flow within the manufacturing system and the dispatch of materials, e.g., wafers, to various processing entities within the manufacturing facility.

A network 20 interconnects various components of the manufacturing system 10, allowing them to exchange information. The illustrative manufacturing system 10 includes a plurality of tools 30-80. Each of the tools 30-80 may be coupled to a computer (not shown) for interfacing with the network 20. In the depicted embodiment, the tools 30-80 are grouped into sets of like tools, as denoted by lettered suffixes. For example, the set of tools 30A-30C represent tools of a certain type, such as a chemical mechanical planarization tool. A particular wafer or lot of wafers progresses through the tools 30-80 as it is being manufactured, with each tool 30-80 performing a specific function in the process flow. Exemplary processing tools for a semiconductor device fabrication environment include metrology tools, photolithography steppers, etch tools, deposition tools, polishing tools, rapid thermal anneal tools, implantation tools, etc. The tools 30-80 are illustrated in a rank and file grouping for illustrative purposes only. In an actual implementation, the tools 30-80 may be arranged in any physical order or grouping. Additionally, the connections between the tools in a particular grouping are meant to represent connections to the network 20, rather than interconnections between the tools 30-80.

A manufacturing execution system (MES) server or centralized controller 90 directs high level operation of the manufacturing system 10. The MES server 90 may monitor the status of the various entities in the manufacturing system 10 (i.e., lots, tools 30-80) and control the flow of articles of manufacture (e.g., lots of semiconductor wafers) through the process flow, i.e., direct which wafer lots are to be processed in which of the tools 30-80. A database server 91 is provided for storing data related to the status of the various tools and articles of manufacture in the process flow. The database server 91 may store information in one or more data stores 92. The data may include pre-process and post-process metrology data, tool states, lot priorities, operating recipes, etc. The centralized controller 90 may also provide operating recipes to one or more of the tools depicted in FIG. 1. Of course, the controller 90 need not perform all of these functions. Moreover, the functions described for the controller 90 may be performed by one or more computers spread throughout the system 10.

The manufacturing system 10 also includes an illustrative fault detection unit 12 executing on an illustrative workstation or controller 93. The fault detection unit 12 is adapted to perform or control various fault detection routines employed in the manufacturing system 10. For example, the fault detection unit 12 may acquire or access a variety of different types of data acquired regarding the performance or operation of one or more of the process tools within the manufacturing system 10. Based upon an analysis of that data, the fault detection unit or controller 12 may take various actions, such as declare a fault condition has occurred, indicate that a potential fault condition or event may occur, etc.

The particular control models used by the process controllers 95 depend on the type of tool 30-80 being controlled. Typically, the controller 95 may be capable of performing run-to-run control of the various tools under its control. The control models may be developed empirically using commonly known linear or non-linear techniques. The control models may be relatively simple equation-based models (e.g., linear, exponential, weighted average, etc.) or a more complex model, such as a neural network model, principal component analysis (PCA) model, partial least squares projection to latent structures (PLS) model. The specific implementation of the control models may vary depending on the modeling techniques selected and the process being controlled. The selection and development of the particular control models would be within the ability of one of ordinary skill in the art, and accordingly, the control models are not described in greater detail herein for clarity and to avoid obscuring the instant invention.

An exemplary information exchange and process control framework suitable for use in the manufacturing system 10 is an Advanced Process Control (APC) framework, such as may be implemented using the Catalyst system formerly offered by KLA-Tencor, Inc. The Catalyst system uses Semiconductor Equipment and Materials International (SEMI) Computer Integrated Manufacturing (CIM) Framework compliant system technologies and is based the Advanced Process Control (APC) Framework. CIM (SEMI E81-0699—Provisional Specification for CIM Framework Domain Architecture) and APC (SEMI E93-0999—Provisional Specification for CIM Framework Advanced Process Control Component) specifications are publicly available from SEMI, which is headquartered in Mountain View, Calif.

In the continuing effort to reduce costs and improve productivity, many of the activities within a semiconductor manufacturing facility have been or will be automated in the future. The ultimate goal will be to achieve a fully automated integrated circuit manufacturing facility wherein there is limited, if any, involvement by human operators. Unfortunately, the centralized control structure depicted in the illustrative manufacturing system 10 shown in FIG. 1 may not be readily adaptable for use in a fully automated integrated manufacturing facility as many of the control functions are performed by the MES server 90. That is, the centralized control system depicted in FIG. 1 may not be the most efficient as it relates to the operation of a fully automated integrated circuit manufacturing facility. Moreover, the prior art control system depicted in FIG. 1 only provides limited control of the processing operations to be performed in one or more of a plurality of tools 30-80 depicted therein. That is, the MES server 90 is adapted to perform at least some functions as it relates to run-to-run control of the various process tools and some fault detection capability. The MES server 90 may also be involved, at least to some degree, in metrology sampling, scheduling and dispatch of wafer lots, scheduling preventative maintenance procedures to be performed on the various process tools, etc. Many additional functions needed to operate the manufacturing facility 10, e.g., physical movement of wafers, control of processing utilities, are controlled by other personnel or computer systems within the fabrication facility 10.

The present invention is directed to overcoming, or at least reducing the effects of, one or more of the problems set forth above.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

The present invention is generally directed to an automated integrated circuit device manufacturing facility using distributed control. In one illustrative embodiment, the system comprises a plurality of process modules and an independent module controller for each of the process modules that is adapted to control a plurality of process tools within each of the modules. Each of the independent module controllers is adapted to independently perform at least run-to-run control of the processing tools within the process module, yield management analysis regarding work to be performed by the process tools within the process module, scheduling of materials provided to and sent from the process module, and movement of wafers within the process module among and between the process tools within the process module.

In another illustrative embodiment, the system comprises a plurality of process modules wherein the plurality of process modules are organized based upon the type of processing operation to be performed by a plurality of process tools within each of the process modules, and an independent module controller for each of the process modules that is adapted to control the process tools within each of the modules. Each of the independent module controllers is adapted to independently perform at least run-to-run control of the processing tools within the process module, yield management analysis regarding work to be performed by the process tools within the process module, scheduling of materials provided to and sent from the process module, and movement of wafers within the process module among and between the process tools within the process module.

In yet another illustrative embodiment, the system comprises a plurality of process modules wherein the plurality of process modules are organized based upon a result produced by a plurality of process tools within each process module and an independent module controller for each of the process modules that is adapted to control the process tools within each of the modules. Each of the independent module controllers is adapted to independently perform at least run-to-run control of the processing tools within the process module, yield management analysis regarding work to be performed by the process tools within the process module, scheduling of materials provided to and sent from the process module, and movement of wafers within the process module among and between the process tools within the process module.

A method of controlling an automated integrated circuit manufacturing facility is also disclosed. In one illustrative embodiment, the method involves providing a plurality of process modules, each of which have an independent module controller that is adapted to control a plurality of process tools within each of the process modules, wherein each of the independent module controllers are adapted to perform at least the following functions: run-to-run control of the processing tools within the process module; yield management analysis regarding work to be performed by the process tools within the process module; scheduling of materials provided to and sent from the process module; and movement of wafers within the process module among or between the process tools within the process module. The method further involves providing a plurality of semiconducting substrates to be processed through the plurality of process modules to form at least a portion of an integrated circuit device above each of the substrates, wherein the independent module controller for each of the process modules controls the process tools within its respective process module that are employed in forming the portion of the integrated circuit device. The methods disclosed herein may be employed with process modules organized in a variety of different ways, such as the illustrative organization schemes described herein.

BRIEF DESCRIPTION OF THE DRAWINGS

The invention may be understood by reference to the following description taken in conjunction with the accompanying drawings, in which like reference numerals identify like elements, and in which.

Figure 1:
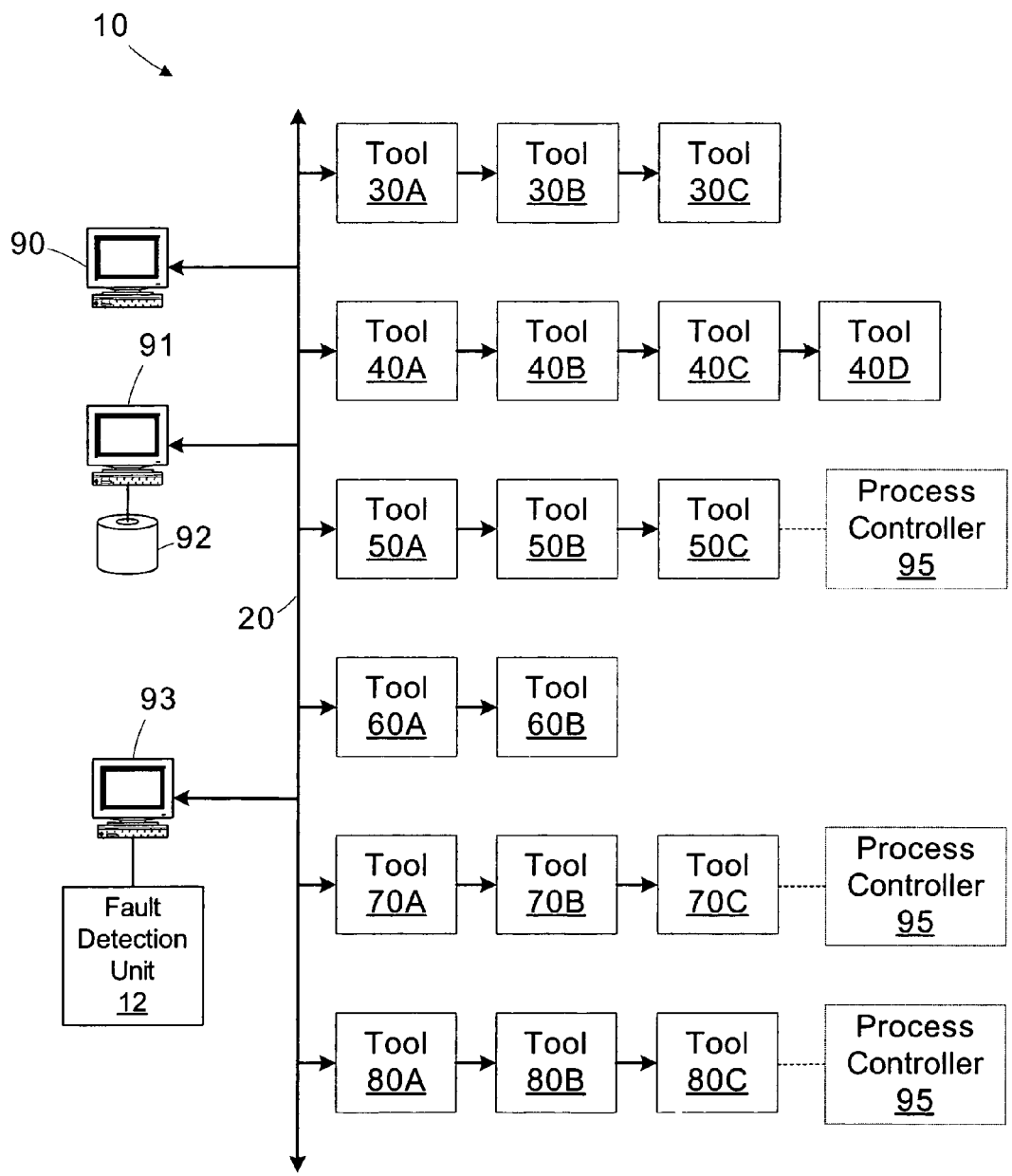
FIG. 1 is a simplified block diagram of an illustrative prior art manufacturing system employed to manufacture integrated circuit devices.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present invention will now be described with reference to the attached figures. Various structures, computers, process tools, and systems are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Portions of the invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Figure 2:
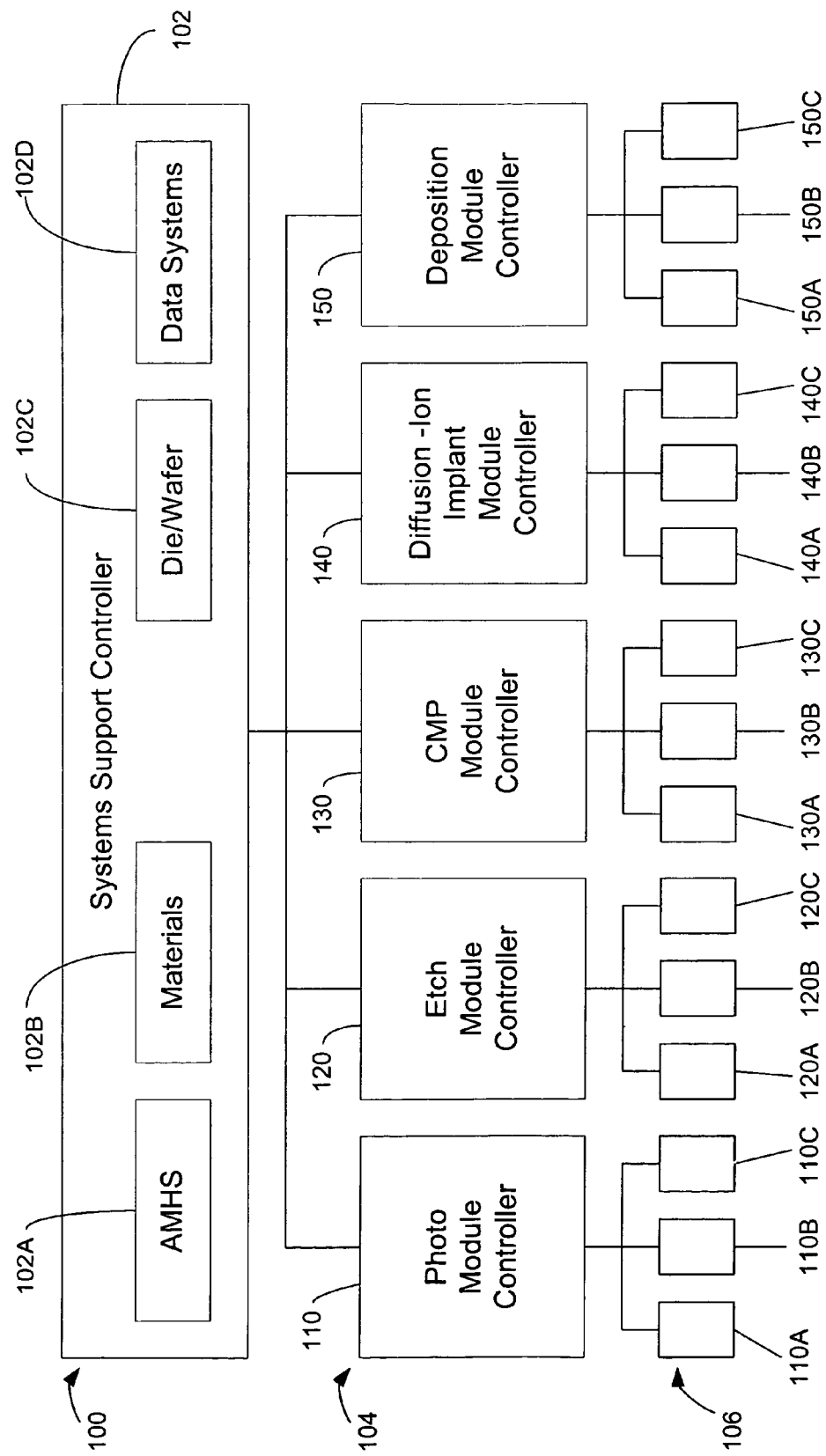
FIG. 2 is a simplified block diagram of one embodiment of an automated integrated circuit manufacturing facility in accordance with one illustrative embodiment of the present invention.

FIG. 2 depicts an illustrative embodiment of a manufacturing system 100 in accordance with one aspect of the present invention. As shown therein, the manufacturing system 100 comprises a system support controller 102 and a plurality of process modules, each of which have an independent module controller (collectively referred to by the reference number 104). In the depicted embodiment, there are five illustrative process modules and five independent module controllers 104: photolithography module controller 110, etch module controller 120, chemical mechanical planarization (CMP) module controller 130, diffusion-implant module controller 140 and deposition module controller 150. As will be recognized by those skilled in the art after a complete reading of the present application, any number of independent module controllers 104 may be provided with respect to a particular manufacturing facility 100. Each of the independent module controllers 104 is adapted to independently control a plurality of process tools (generally referenced as item 106) within each of the respective process modules and to communicate with other independent module controllers and the system support controller 102. In the embodiment depicted in FIG. 2, the various process tools are labeled with a corresponding letter suffix, e.g., A-C. As will be described more fully below, the number and/or type of process tools controlled by each of the respective independent module controllers 110, 120, 130, 140, 150 may vary depending upon the particular application. As used herein, the term "independent module controller" is intended to mean that the module controller is dedicated to performing its described activities within its respective process module. The independent module controller may also communicate and exchange data with various controllers outside of its process module for a variety of purposes, e.g., to indicate the status of the work flow in its respective module to other independent module controllers, to request materials from the system support controller, etc. Of course, the independent module controller may be physically comprised of several controllers that are dedicated to performing the independent control activities within a particular module.

In general, in accordance with one aspect of the present invention, the integrated circuit manufacturing facility 100 provides a distributed form of control with respect to various activities performed in manufacturing integrated circuit devices. More specifically, each of the independent module controllers 104 provides command and control functions as it relates to the control of the various processing tools 106 controlled by each of the independent module controllers 104. The systems support controller 102 is adapted to control various systems and utilities that may be demanded by each of the independent module controllers 104 on an as-needed basis.

As an example, in the embodiment depicted in FIG. 2, the system support controller 102 is adapted to control an automated material handling system (AMHS) 102a to provide various workpieces, e.g., wafers or lots of wafers, to the various process modules when demanded by or scheduled for each the respective independent module controllers 104. Although not depicted in the drawing, such an automated material handling system (AMHS) may comprise a plurality of robots or moveable carriers that are adapted to transport wafers, or a lot of wafers, to various locations within the manufacturing facility 100. The system support controller 102 is also adapted to control or regulate the provision of various consumable materials, as indicated in block 102B, that may be needed by the various processing tools 106 controlled by the various independent process module controllers 104. For example, such materials may include process gases, process liquids, electrical power, chemical mechanical polishing pads, polishing slurry, spare parts, test or qualification wafers, process kit changes, etc.

The system support controller 102 is also adapted to provide die/wafer information, as indicated at block 102C, to any or all of the independent module controllers 104 on demand. The die/wafer information may reflect the processing history of the die/wafers that have previously been processed in one or more of the process modules depicted in FIG. 2. The system support controller 102 is adapted to control various data systems that may be employed within the manufacturing facility 100. For example, as indicated in FIG. 2, data systems unit 102D is adapted to acquire and store data regarding any type of information that may be useful in manufacturing integrated circuit devices. For example, such data may include, but is not limited to, data regarding physical characteristics of features formed on or above the wafers as they progress through the manufacturing facility, the composition and concentration of the various chemicals in the process gases and/or liquids supplied to the various process modules, as well as any of a variety of different types of metrology data. Specific examples include, but are not limited to, film thickness, optical properties, critical dimensions, feature profiles, defects, irregularities, etc.

In general, the system support controller 102 acts to control the various support facilities and utilities that the various independent module controllers 104 will need in performing their command and control activities with respect to the processing tools 106 under their respective controls. In the embodiment depicted in FIG. 2, command and control activities are distributed down to the modular level, where the each of the independent module controllers 104 perform all of the command and control activities associated with the control and operation of the processing tools 106 under their respective control. In the illustrative example depicted in FIG. 2, the plurality of process modules 104 are organized based on the types of process operations to be performed by the various process tools 106 under the control of each respective independent module controller 104. Each of the respective independent module controllers 104 are adapted to control any number of process tools that are useful in performing the ultimate objective of the module. For example, in the illustrative embodiment of FIG. 2, the independent module controller 110 is adapted to control a plurality of photolithography modules 110A, 110B, and an illustrative metrology tool 110C. In this embodiment, each of the photolithography modules 110A, 110B may be adapted to form a patterned layer of photoresist above a layer of gate electrode material, e.g., polysilicon. The metrology tool 110C may be employed to assure that the patterned layer of photoresist is properly registered, e.g., no overlay error, and to determine the critical dimension of the various features formed in the patterned layer of photoresist. Of course, a variety of such process tools 106 may be controlled by the independent photolithography module controller 110.

The independent etch module controller 120 is also adapted to control a plurality of process tools to form various features on or above a semiconductor substrate. For example, the independent etch module controller 120 is adapted to control a plurality of etch tools 120A, 120B, and 120C. In one illustrative embodiment, the etch tool 120A is adapted to perform an etching process on a layer of polysilicon ("poly etch"), the etch tool 120B is adapted to perform an etching process on a layer of metal ("metal etch") and the etch tool 120C is adapted to perform one or more etching processes in a damascene etch process ("damascene etch"). The number of such process tools controlled by the independent etch module controller 120 may vary depending upon the particular application. In some cases, one or more of the tools 120A-120C may be a metrology tool that is adapted to perform various metrology operations. For example, when a metrology tool is involved, the independent controller 120 may be able to control various metrology operations such as critical dimension measurements, feature profile measurements, trench depth measurements, etc.

In a similar fashion, the independent chemical mechanical planarization (CMP) module controller 130 is adapted to control a plurality of CMP process tools 130A-130C. The various CMP tools 130A-130C may have various performance capabilities. For example, the CMP tool 130A may be adapted to perform polishing the processes on layers of copper ("Cu polish"), whereas the polishing 130C may be adapted to perform polishing operations on various layers of insulating material ("ILD polish"). The CMP module may also contain one or more metrology tools and the independent CMP controller 130 may be employed to control various metrology actions within the CMP module, e.g., measurement of film thickness or dishing, detection of residual copper, etc.

Similarly, the independent diffusion/implant module controller 140 may be adapted to control an illustrative furnace 140A, a rapid thermal anneal chamber 140B, and an ion implant tool 140C. The various tools under the independent module controller 140 may be adapted to perform specific processing operations. For example, an ion implant tool may be adapted and configured so as to implant only boron atoms or a furnace may be configured to perform an oxidation process to form gate insulation layers for various integrated circuit devices, etc. The diffusion/implant module may also employ one or more metrology tools therein for purposes of obtaining metrology data that is relevant to the processing operations performed therein. For example, the independent module controller 140 may be employed to control the acquisition of metrology data such as chemical compositions, resistivity, etc.

FIG. 2 also depicts an illustrative independent deposition module controller 150. As shown therein, the independent deposition module controller 150 is adapted to control a plurality of deposition tools 150A-150C. For example, the deposition tool 150A may be a chemical vapor deposition tool or chamber, the deposition tool 150B may be tool or chamber adapted to perform a physical vapor deposition process, the tool 150C may be adapted to perform a plasma enhanced chemical vapor deposition process. The various deposition tools under the control of the independent deposition module controller 150 may be adapted to form any of a variety of different layers of material, e.g., insulating layers, polysilicon, metal layers, etc. The deposition module may also employ one or more metrology tools for purposes of obtaining metrology data relevant to the processing operations performed in the deposition module. In that case, the independent module controller 150 may be employed in obtaining a variety of different types of metrology data, such as, for example, film thickness measurements, optical properties of various layers of material, etc.

As indicated above, the number of module controllers 104 and their intended function may vary depending upon the particular application. For example, the manufacturing system 100 depicted in FIG. 2 may also include a process module that performs and controls various tests, although such a process module is not depicted in FIG. 2. As a specific example, such a process module may be a wafer electrical test (WET) module that is adapted to obtain metrology data regarding the electrical performance characteristics of integrated circuit devices, either partially or completely formed, that are formed using the manufacturing system 100. In such an embodiment, an independent WET module controller would be adapted to control the operations of various metrology tools that are used to obtain the desired electrical test data from the partially completed or completed integrated circuit devices.

In accordance with one aspect of the present invention, each of the independent process module controllers 104 are provided with command and control capability with respect to the control of various processing tools 106 under their individual control. In accordance with this aspect of the present invention, the command and control decisions are distributed in the sense that they occur at the process module level as opposed to a control system wherein control actions are concentrated at a higher level, e.g., a centralized control system like that depicted in FIG. 1 wherein centralized control is performed by the MES server. Each of the independent module controllers 104 may be adapted to perform a variety of functions. For example, each of the independent module controllers 104 are adapted to perform run-to-run control of the process tools 106 within each respective process module. That is, each of the respective independent module controllers 104 is adapted to determine which process recipes are to be run each of the illustrative tools 106 under its control. In performing this run-to-run control, each of the independent module controllers 104 may receive a feedback from process tools 106 within the respective process module regarding the effectiveness of the processing operations performed therein. Based upon this feedback, each of the module controllers 104 may adjust the processing operations and/or recipes performed by the various process tools 106 under its control.

Each of the independent module controllers 104 is also adapted to perform yield management analysis. That is, each of the independent module controllers 104 is adapted to determine which processing tool, or set of processing tools, under its control will be employed to perform a particular process operation. For example, in the context where it is desired to form very high-speed microprocessors, the independent etch module controller 120 may select a particular etch tool, e.g., 120B, to perform the particular etching process to form gate electrode structures. The selection of a particular process test for a particular process operation may be based upon historical data, e.g., the etch tool 120B consistently produces gate electrode structures exhibiting the desired target size. Such yield management analysis may involve a variety of factors. For example, yield management analysis may involve consideration of which process of tools provide the greatest throughput, which process tools produce results that are closest to target values, which tools produce the lowest number of defects, which tools provide the strongest correlation to wafer electrical test (WET) results, which tools produce the highest distribution to target values, etc.

Each of the independent module controllers 104 is also adapted to perform material scheduling activities. To that end, each of the independent module controllers 104 is adapted to determine the control of the flow of wafers to and from the various process modules. That is, each of the independent module controllers 104 may regulate the flow of wafers into and out of each of the respective process modules. In performing this activity, the independent module controllers 104 may interface with the other independent module controllers 104 to determine the status of the various process tools and/or activities in each of the respective process modules. For example, when all of the illustrative process tools 130A-C are busy processing wafers, the CMP module controller 130 may prevent other wafers from being provided to the CMP process module.

The material scheduling activities performed by the independent module controllers 104 may also include planning factors, operational efficiency factors, automated material handling factors and advanced production control factors. Planning factors include customer delivery, performance-to-mix, average lateness/tardiness. Customer delivery performance may include, but are not limited to, methods such as critical ratio, slack time, etc. Performance-to-mix and lateness/tardiness is handled by setting key parameters such as due date and priority. Operational efficiency factors include WIP (work-in-progress) control at key operations and/or key tools, consideration of equipment downtime events such as preventive maintenance (PM), resource availability such as operators, reticles, etc. A subset of key tools are the bottleneck or capacity limiting tools in a fab. Special considerations are provided such as ensuring no "idle, with WIP" situations at the bottleneck. Factors such as "Hunger Ratio" (as that concept is disclosed and explained in U.S. Pat. No. 6,243,612, which is hereby incorporated in its entirety by reference) could be used in ensuring WIP at the bottleneck. Scheduling of PM tasks will be factored in by appropriately weighing their importance relative to their criticality against the current WIP queues. Automated material handling factors will involve feeding rates and policies depending upon the type of tools as well as storage capabilities. The feeding rates will depend upon the tool throughput, number of loadport and other factors such as internal buffering, loadlocks, internal tool scheduling/sequencing, etc. The storage factors will consider delivery performance against remote storage in stockers, bay storage in stockers and proximity storage in the automated material handling system's tracks. Advanced production control factors will include the policy of the APC controller, i.e., feedback, feed forward, supervisory control, etc. In addition, there will be other considerations such as tool preferences, tool exclusions, thread expirations, etc. All of the above factors may be aggregated through a trading floor/market mechanism to arrive at an overall scheduling priority necessary to ensure a near-optimal and achievable schedule both for the lot and the resource for lot processing.

Each of the independent module controllers 104 is also adapted to control wafer dispatching activities within each of their respective process modules. That is, once the wafers arrive at a particular process module, each of the respective independent module controllers 104 may control the physical movement of the wafers to and/or among the various processing tools 106 within its respective process module. In performing the activities, various robotic handling systems (not shown), known to those skilled in the art, may be employed.

Figure 3:
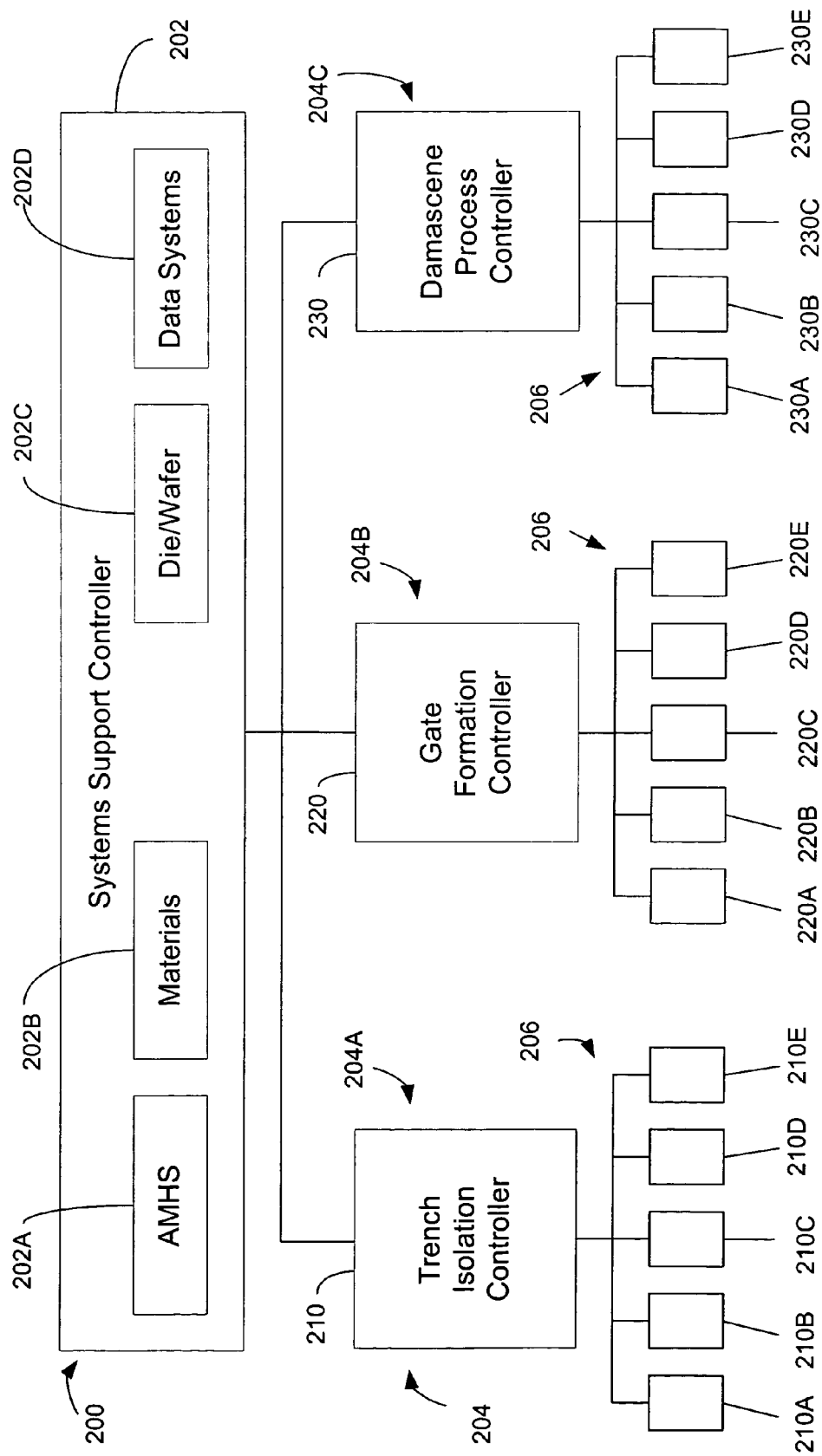
FIG. 3 is another simplified diagram of another illustrative embodiment of an automated integrated circuit manufacturing facility in accordance with the present invention.

FIG. 3 depicts another illustrative embodiment of an integrated circuit manufacturing facility 200 in accordance with the present invention. As shown therein, the manufacturing facility 200 comprises a systems support controller 202 that performs the same activities as those described above with respect to the system support controller 102 depicted in FIG. 2.

In FIG. 3, the manufacturing system 200 is organized into a plurality of process modules, collectively designated by the reference number 204. Any number of such process modules may be established within the manufacturing facility 200. In general, in the manufacturing system 200 depicted in FIG. 3, the process modules are organized based upon a result produced by a plurality of process tools, collectively designated by the reference number 206, within each of the process modules. Three illustrative process modules are depicted in FIG. 3: a trench isolation formation module 204A, a gate formation module 204B, and a damascene process module 204C.

Each of the process modules (204A-204C) is provided with an independent controller, generally referred to with the reference number 204. In the illustrative embodiment depicted in FIG. 3, the independent module controllers 204 comprise an independent trench isolation controller 210, an independent gate formation controller 220, and an independent damascene process controller 230. The various independent controllers are adapted to command and control various process tools 206 under their respective control, as described more fully below. More specifically, the trench isolation controller 210 is adapted to control a plurality of process tools 210A-210E that are adapted to perform various operations as it relates to the formation of a trench isolation region in a semiconducting substrate. For example, the process tool 210A may be a deposition tool adapted to deposit a layer of silicon nitride above the surface of a semiconductor substrate, the process tool 210B may be a photolithography module adapted to form a patterned layer of photoresist above the silicon nitride layer, and the process tool 210C may be one or more etch tools adapted to etch the layer of the silicon nitride to define an opening therein and to perform an etching process to define a trench in the semiconducting substrate. Thereafter, a deposition tool 210D may be used to deposit a layer of insulating material, e.g., silicon dioxide, in the trench formed in the substrate and above the patterned layer of silicon nitride. Thereafter, a CMP tool 210E may be used to perform a planarization process to clear the deposited insulating material from above the surface of the silicon nitride layer. Lastly, the one or more etch tools 210C may be used to remove the silicon nitride layer after the CMP process is performed. One or more metrology tools may also be provided within the trench isolation formation module 204A and be under the control of the trench isolation controller 210. Such metrology tool(s) may be adapted to obtain metrology data relating to the activities performed within the trench isolation formation module 204A. For example, such metrology tools may be adapted to obtain metrology data regarding trench depth, trench profile, film thicknesses, optical parameters, etc.

The independent gate formation controller 220 may be adapted to control a plurality of process tools 206 used in the formation of the gate structure of an illustrative transistor device. For example, the process tool 220A may be a furnace adapted to perform a thermal oxidation process to grow a gate insulation layer comprised of silicon dioxide. The process tool 220B may be a deposition tool adapted to deposit a layer of gate electrode material, e.g., polysilicon, above the gate insulation layer. The process tool 220C may be a photolithography module adapted to form a patterned layer of photoresist above the layer of gate electrode material. The process 220D may be an etch tool that is adapted to perform an etching process on the layer of polysilicon to thereby define a plurality of gate electrode structures. The process tool 220E may be a metrology tool that is adapted to measure a critical dimension of the resulting gate electrode structures. Of course, any number of additional process tools 206 may be under the control of the independent gate formation controller 220. For example, another process tool (not shown) may be a wet etching tool or bath that is used to strip the remaining positions of the patterned layer of photoresist after the gate electrode structures have been defined by performed the etching process described above. One or more metrology tools may also be provided within the gate formation module 204B and be under the control of the independent gate formation controller 220. Such metrology tool(s) may be adapted to obtain metrology data relating to the activities performed within the gate formation module 204B. For example, such metrology tools may be adapted to obtain metrology data regarding the critical dimension of the gate electrode, the profile of the gate electrode, the thickness or properties of the gate insulation layer, etc.

The independent damascene process controller 230 is also adapted to control a plurality of process tools 206 that may be used in performing known damascene techniques to form conductive interconnections in one or more layers of insulating material. For example, the process tool 230A may be a deposition tool adapted to deposit a low-k layer of insulating material. The tool 230B may be a photolithography module adapted to form a patterned layer of photoresist above the layer of low-k material formed by the process tool 230A. The process tool 230C may be an etch tool that is adapted to etch the low-k layer of material using the patterned layer of photoresist as a mask. The process tool 230D may be a physical vapor deposition tool that is adapted to deposit a barrier layer and/or copper seed layer on the patterned layer of insulating material and/or in the trenches formed therein. The process tool 230E may be an electroplating tool adapted to perform a bulk copper deposition process using known electroplating techniques. One or more metrology tools may also be provided within the damascene formation module 204C and be under the control of the independent damascene controller 230. Such metrology tool(s) may be adapted to obtain metrology data relating to the activities performed within the damascene formation module 204C. For example, such metrology tools may be adapted to obtain metrology data regarding trench depth, trench profile, film thicknesses, etc.

In the embodiment depicted in FIG. 3, command and control decisions are performed by each of the respective independent module controllers 210, 220, 230, to control the various process tools 206 under their respective control to achieve the desired result. In this embodiment, in contrast to the prior art system depicted in FIG. 1, the command and control functions are organized based upon the desired process result of the collection of process tools 206 within each process module. Each of the individual controllers 210, 220, 230 are adapted to perform activities such as run-to-run control, yield management analysis, material scheduling, and wafer dispatch, as described above with respect to the process modules 104 depicted in FIG. 2.

Figure 4:
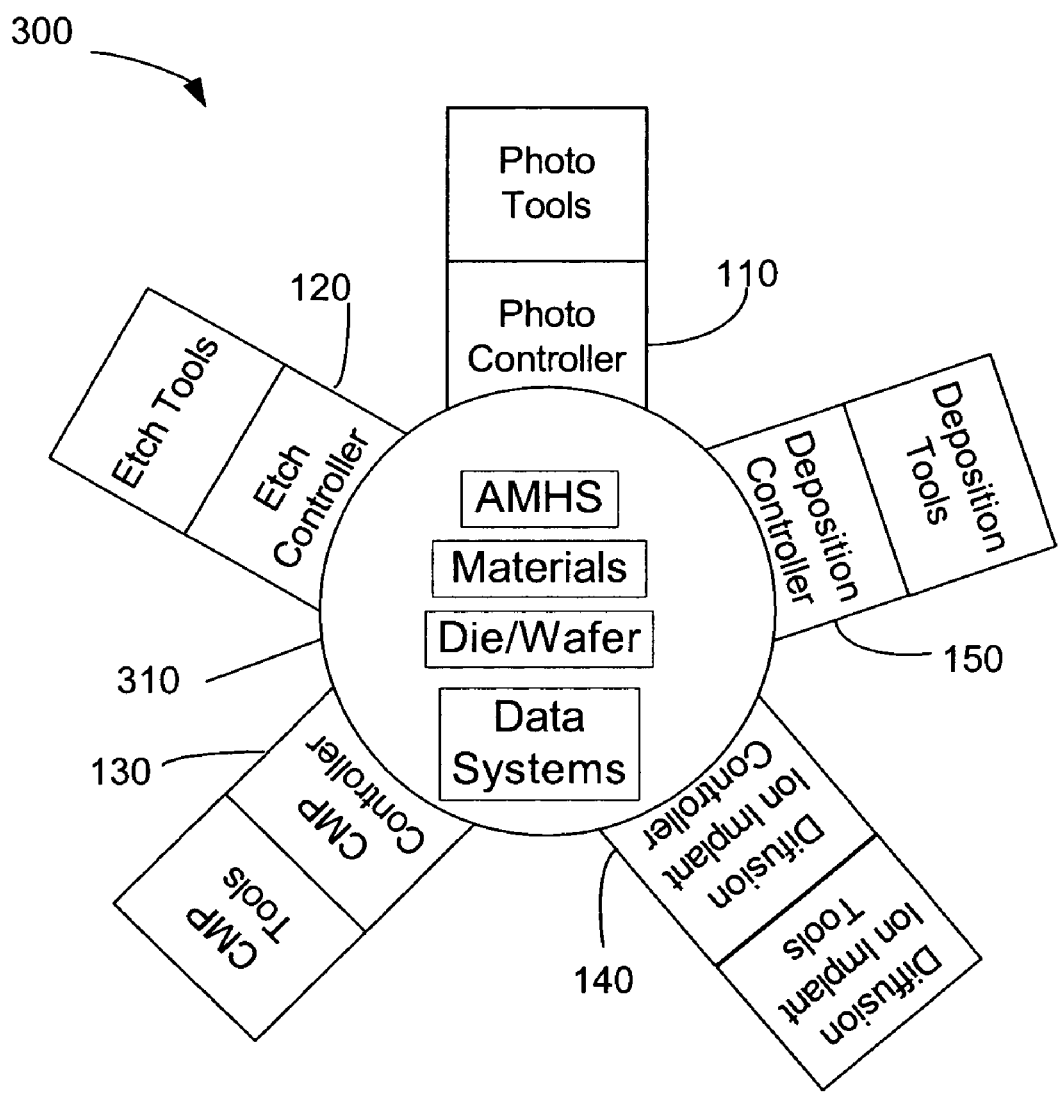
FIG. 4 is a simplified block diagram depiction of one illustrative physical configuration of an illustrative integrated circuit facility.

FIG. 4 depicts an illustrative configuration of a semiconductor manufacturing facility 300 which may be employed with the control system 100 depicted in FIG. 2. The illustrative manufacturing facility 300 depicted in FIG. 4 is arranged in a hub and spoke arrangement. In this embodiment, the central utilities employed in the fabrication facility 300 may be positioned within a central region 310 of the fabrication facility 300 and a plurality of production wings may extend from the central facility 210 wherein the independent controllers 110, 120, 130, 140, 150 control various process tools under their control. Such a physical arrangement of a manufacturing facility 300 may be optimal in view of the fact that the command and control activities are distributed by the various independent controllers, as described previously. One illustrative example of an arrangement of a semiconductor manufacturing facility where the inventions disclosed herein may be employed is described in U.S. Pat. No. 5,344,356, which is hereby incorporated by reference in its entirety.

Figure 5:
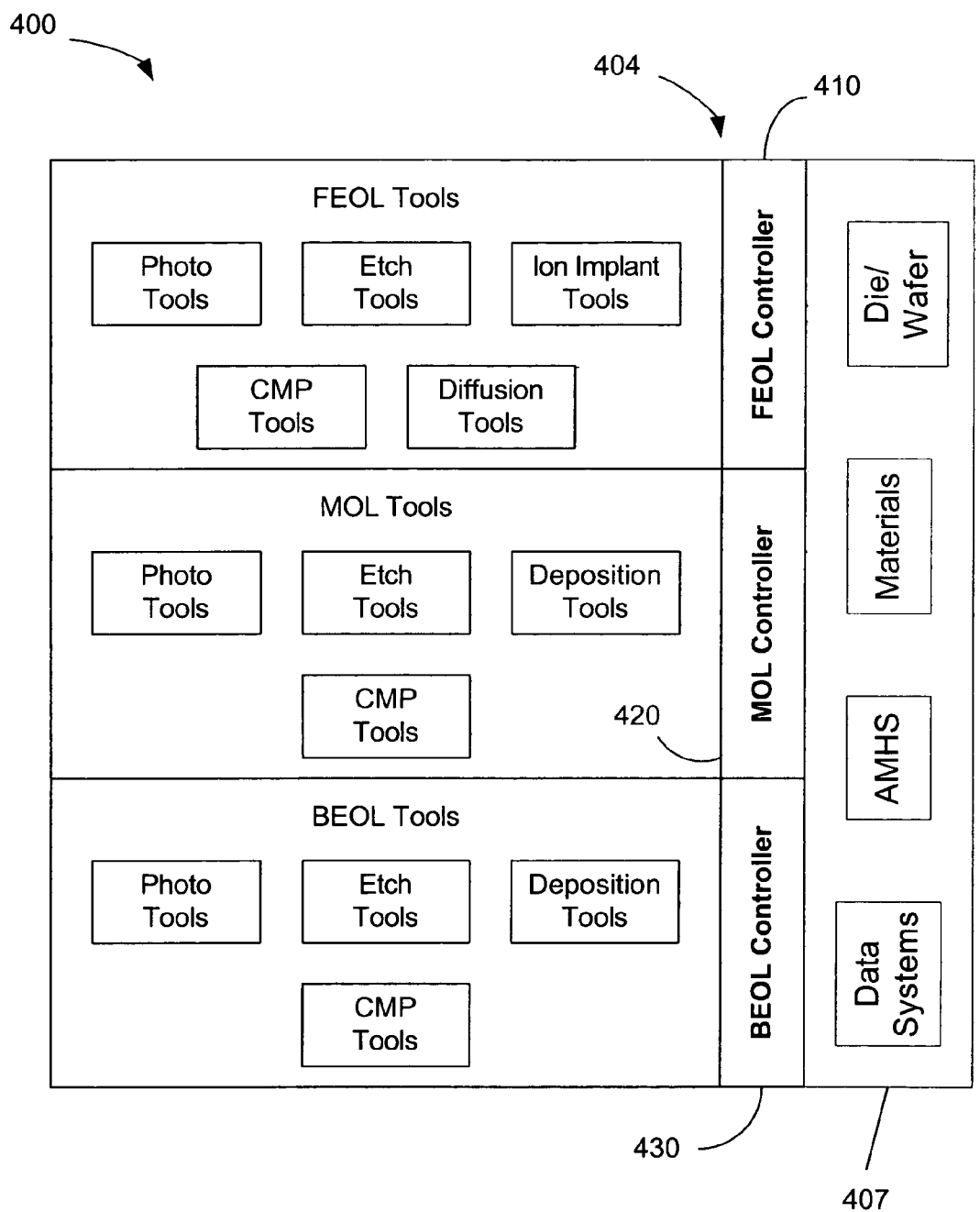
FIG. 5 is yet another illustrative example of a physical configuration of an illustrative integrated circuit manufacturing facility.

FIG. 5 depicts an alternative embodiment of a potential physical layout of an integrated circuit manufacturing facility 400. In this embodiment, command and control activities are provided to various independent controllers that are organized based upon the process tools employed at various stages of manufacturing of a integrated circuit device. In general, the activities within a typical integrated circuit manufacturing system may be segregated into front-end of the line (FEOL) activities, middle of the line (MOL) activities, and back end of the line (BEOL) activities. The segregation of the manufacturing activities into these categories may vary somewhat depending upon the particular devices under construction and the particular process flows involved in producing such devices. In one illustrative example, FEOL activities may include all processing activities performed up to the point of forming local interconnects for the integrated circuit device. In the case of forming devices comprised of transistors, the FEOL activities would include complete formation of the basic transistor structures, e.g., gate electrodes, source/drain regions, sidewall spacers, etc. The MOL activities would include formation of local interconnect structures, which are typically comprised of a metal. The local interconnect structures actually contact the transistor devices (or other similar structures). The BEOL activities would include all activities after the formation of the local interconnects. For example, the BEOL activities would include, but are not limited to, the formation of various metallization layers in multiple levels of insulating material, all of which may be performed in accordance with known processing techniques.

In the embodiment depicted in FIG. 5, the manufacturing system 400 comprises an independent front end of line (FEOL) controller 410 that is adapted to control a plurality of process tools, e.g., FEOL tools, such as deposition tools, etch tools, ion implant tools, furnaces, metrology tools, CMP tools, etc., that may be employed in performing various front end processing operations. Similarly, the independent middle of the line (MOL) controller 420 is adapted to control various processing tools that may be employed in performing MOL activities, e.g., deposition tools, etch tools, CMP tools, etc. Lastly, the independent back end of the line (BEOL) controller 430 is adapted to control a plurality of process tools that are adapted to perform BEOL processing activities, e.g., deposition tools, photolithography tools, etch tools, CMP tools, etc.

The present invention is generally directed to automated integrated device manufacturing facility using distributed control and various methods of using same. In one illustrative embodiment, the system comprises a plurality of process modules and an independent module controller for each of the plurality of process modules that is adapted to control a plurality of process tools within each of the modules. Each of the independent module controllers is adapted to perform at least run-to-run control of the processing tools within the process module, yield management analysis regarding work to be performed by the process tools within the process module, scheduling of materials provided to and sent from the process module, and movement of wafers within the process module among and between the process tools within the process module. In further embodiments, the plurality of process modules are organized based upon the type of processing operation to be performed by the plurality of process tools within the module. In other embodiments, the plurality of process modules are organized based upon a result produced by the plurality of process tools within each process module.

In one illustrative embodiment, the method involves providing a plurality of process modules, each of which have an independent module controller that is adapted to control a plurality of process tools within each of the process modules, wherein each of the independent module controllers are adapted to perform at least the following functions: run-to-run control of the processing tools within the process module; yield management analysis regarding work to be performed by the process tools within the process module; scheduling of materials provided to and sent from the process module; and movement of wafers within the process module among or between the process tools within the process module. The method further involves providing a plurality of semiconducting substrates to be processed through the plurality of process modules to form at least a portion of an integrated circuit device above each of the substrates, wherein the independent module controller for each of the process modules controls the process tools within its respective process module that are employed in forming the portion of the integrated circuit device. The methods disclosed herein may be employed in cases where the process modules are organized in any of the variety of different configurations disclosed herein.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. An automated manufacturing facility comprising:
   a plurality of process modules;
   an independent module controller for each of said plurality of process modules that is adapted to control a plurality of process tools within each of said process modules, each of said independent module controllers adapted to perform at least the following functions:
      run-to-run control of the processing tools within the process module;
      yield management analysis regarding work to be performed by said process tools within said process module;
      scheduling of materials provided to and sent from said process module; and
      movement of wafers within said process module among or between the process tools within the process module; and
   a support systems controller configured to control a plurality of support utilities to be provided to at least one of said process modules in response to a request from the independent module controller for said at least one support utility.

2. The system of claim 1, wherein said support systems controller is adapted to control at least the following activities for providing said at least one support utility:
   automated wafer handling between said plurality of process modules;
   distribution of consumable processing materials to said plurality of process modules;
   collect and store historical processing information related to a plurality of wafers; and
   collect and store data regarding process operations performed within the plurality of process modules.

3. The system of claim 1, wherein said plurality of process modules each comprise a plurality of processing tools for performing the same type of processing operation.

4. The system of claim 1, wherein said plurality of process modules comprise a photolithography module, an etch module, a chemical mechanical planarization module, a diffusion/ion implant module, and a deposition module.

5. The system of claim 1, wherein at least one of said process modules is a photolithography module, and said plurality of process tools comprises a plurality of photolithography tools positioned within said photolithography module.

6. The system of claim 1, wherein at least one of said process modules is an etch module, and said plurality of process tools comprises a plurality of etch tools positioned within said etch module.

7. The system of claim 4, wherein at least one of said process modules is a chemical mechanical planarization module, and said plurality of process tools comprises a plurality of chemical mechanical planarization tools positioned within said chemical mechanical planarization module.

8. The system of claim 1, wherein at least one of said process modules is a diffusion/ion implant module, and said plurality of process tools comprises at least one diffusion furnace and at least one ion implant tool positioned within said diffusion/ion implant module.

9. The system of claim 1, wherein at least one of said process modules is a deposition module, and said plurality of process tools comprises a plurality of deposition tools positioned within said deposition module.

10. The system of claim 1, wherein said plurality of process modules each comprise a plurality of processing tools configured to produce a selected result.

11. The system of claim 10, wherein at least one of said process modules comprise a trench formation process module.

12. The system of claim 10 wherein at least one process of said modules comprises a gate formation process module.

13. The system of claim 10, wherein at least one said process modules comprise a damascene formation process module.

14. An automated manufacturing facility comprising:
   a plurality of process modules wherein said plurality of process modules are organized based upon the type of processing operation to be performed by a plurality of process tools within each of said process modules;
   an independent module controller for each of said plurality of modules that is adapted to control said plurality of process tools within each of said modules, each of said independent module controllers adapted to perform at least the following functions:
  run-to-run control of the processing tools within the process module;
  yield management analysis regarding work to be performed by said process tools within said process module;
  scheduling of materials provided to and sent from said process module; and
  movement of wafers within said process module among or between the process tools within the process module; and
a support systems controller configured to control a plurality of support utilities to be provided to at least one of said process modules in response to a request from the independent module controller for said at least one support utility.

15. The system of claim 14, wherein said support systems controller is adapted to control at least the following activities for providing said at least one support utility:
  automated wafer handling between said plurality of process modules;
  distribution of consumable processing materials to said plurality of process modules;
  collect and store historical processing information related to a plurality of wafers; and
  collect data regarding process operations performed within the plurality of process modules.

16. The system of claim 14, wherein said plurality of process modules comprise a photolithography module, an etch module, a chemical mechanical planarization module, a diffusion/ion implant module, and a deposition module.

17. The system of claim 14, wherein at least one of said process modules is a photolithography module, and said plurality of process tools comprises a plurality of photolithography modules positioned within said photolithography module.

18. The system of claim 14, wherein at least one of said process modules is an etch module, and said plurality of process tools comprises a plurality of etch tools positioned within said etch module.

19. The system of claim 14, wherein at least one of said process modules is a chemical mechanical planarization module, and said plurality of process tools comprises a plurality of chemical mechanical planarization tools positioned within said chemical mechanical planarization module.

20. The system of claim 14, wherein at least one of said process modules is a diffusion/ion implant module, and said plurality of process tools comprises at least one diffusion furnace and at least one ion implant tool positioned within said diffusion/ion implant module.

21. The system of claim 14, wherein at least one of said process modules is a deposition module, and said plurality of process tools comprises a plurality of deposition tools positioned within said deposition module.

22. An automated manufacturing facility comprising:
  a plurality of process modules wherein said plurality of process modules are organized based upon a processing result produced by a plurality of process tools within each process module;
  an independent module controller for each of said plurality of modules that is adapted to control said plurality of process tools within each of said modules, each of said independent module controllers adapted to perform at least the following functions:
    run-to-run control of the processing tools within the process module;
    yield management analysis regarding work to be performed by said process tools within said process module;
    scheduling of materials provided to and sent from said process module; and
    movement of wafers within said process module among or between the process tools within the process module; and
  a support systems controller configured to control a plurality of support utilities to be provided to at least one of said process modules in response to a request from the independent module controller for said at least one support utility.

23. The system of claim 22, wherein said support systems controller is adapted to control at least the following activities for providing said at least one support utility:
  automated wafer handling between said plurality of process modules;
  distribution of consumable processing materials to said plurality of process modules;
  collect and store historical processing information related to a plurality of wafers; and
  collect and store data regarding process operations performed within the plurality of process modules.

24. The system of claim 22, wherein at least one of said process modules comprise a trench formation process module.

25. The system of claim 22, wherein at least one process of said modules comprises a gate formation process module.

26. The system of claim 22, wherein at least one said process modules comprise a damascene formation process module.

27. A method of controlling an automated integrated circuit manufacturing facility comprising:
  providing a plurality of process modules, each of which have an independent module controller that is adapted to control a plurality of process tools within each of said process modules, wherein each of said independent module controllers are adapted to perform at least the following functions:
    run-to-run control of the processing tools within the process module;
    yield management analysis regarding work to be performed by said process tools within said process module;
    scheduling of materials provided to and sent from said process module; and
    movement of wafers within said process module among or between the process tools within the process module;
  providing a support systems controller configured to control a plurality of support utilities to be provided to at least one of said process modules in response to a request from the independent module controller for said at least one support utility; and
  providing a plurality of semiconducting substrates to be processed through said plurality of process modules to form at least a portion of an integrated circuit device above each of said substrates, wherein said independent module controller for each of said process modules controls said process tools within its respective process module that are employed in forming said portion of said integrated circuit device.

28. The method of claim 27, wherein said support systems controller further performs at least the following activities for providing said at least one support utility:
  automated wafer handling between said plurality of process modules;

distribution of consumable processing materials to said plurality of process modules;
collect and store historical processing information related to a plurality of wafers; and
collect and store data regarding process operations performed within the plurality of process modules.

29. The method of claim 27, wherein said plurality of process modules are organized based upon the type of processing operation to be performed by said plurality of process tools.

30. The method of claim 27, wherein said plurality of process modules are organized based upon a result produced by said plurality of process tools within each process module.

31. The method of claim 30, wherein at least one of said process modules comprise a trench formation process module.

32. The method of claim 30, wherein at least one process of said modules comprises a gate formation process module.

33. The system of claim 30, wherein at least one said process modules comprise a damascene formation process module.

34. A method of controlling an automated integrated circuit manufacturing facility comprising:
providing a plurality of process modules wherein said plurality of process modules are organized based upon the type of processing operation to be performed by a plurality of process tools within each of said process modules, each of said process modules having an independent module controller that is adapted to control said plurality of process tools within each of said modules, wherein each of said independent module controllers are adapted to perform at least the following functions:
run-to-run control of the processing tools within the process module;
yield management analysis regarding work to be performed by said process tools within said process module;
scheduling of materials provided to and sent from said process module; and
movement of wafers within said process module among or between the process tools within the process module;
providing a support systems controller configured to control a plurality of support utilities to be provided to at least one of said process modules in response to a request from the independent module controller for said at least one support utility; and
providing a plurality of semiconducting substrates to be processed through said plurality of process modules to form at least a portion of an integrated circuit device above each of said substrates, wherein said independent module controller for each of said process modules controls said process tools within its respective process module that are employed in forming said portion of said integrated circuit device.

35. The method of claim 34, wherein said support systems controller further performs at least the following activities for providing said at least one support utility:
automated wafer handling between said plurality of process modules;
distribution of consumable processing materials to said plurality of process modules;
collect and store historical processing information related to a plurality of wafers; and
collect data regarding process operations performed within the plurality of process modules.

36. The method of claim 34, wherein said plurality of process modules comprise a photolithography module, an etch module, a chemical mechanical planarization module, a diffusion/ion implant module, and a deposition module.

37. A method of controlling an automated integrated circuit manufacturing facility comprising:
a plurality of process modules wherein said plurality of process modules are organized based upon a processing result produced by a plurality of process tools within each process module, each of said process modules having an independent module controller that is adapted to control said plurality of process tools within each of said modules, wherein each of said independent module controllers are adapted to perform at least the following functions:
run-to-run control of the processing tools within the process module;
yield management analysis regarding work to be performed by said process tools within said process module;
scheduling of materials provided to and sent from said process module; and
movement of wafers within said process module among or between the process tools within the process module;
a support systems controller configured to control a plurality of support utilities to be provided to at least one of said process modules in response to a request from the independent module controller for said at least one support utility; and
providing a plurality of semiconducting substrates to be processed through said plurality of process modules to form at least a portion of an integrated circuit device above each of said substrates, wherein said independent module controller for each of said process modules controls said process tools within its respective process module that are employed in forming said portion of said integrated circuit device.

38. The method of claim 37, wherein said support systems controller is adapted to control at least the following activities for providing said at least one support utility:
automated wafer handling between said plurality of process modules;
distribution of consumable processing materials to said plurality of process modules;
collect and store historical processing information related to a plurality of wafers; and
collect and store data regarding process operations performed within the plurality of process modules.

39. The method of claim 37, wherein at least one of said process modules comprise a trench formation process module.

40. The method of claim 37, wherein at least one process of said modules comprises a gate formation process module.

41. The system of claim 37, wherein at least one said process modules comprise a damascene formation process module.

* * * * *